United States Patent [19]

Scarlett et al.

[11] Patent Number: 5,992,533
[45] Date of Patent: Nov. 30, 1999

[54] METHOD AND APPARATUS FOR CONTROLLING WIDTH-ADJUSTABLE TILLAGE IMPLEMENT

[75] Inventors: Andrew James Scarlett, Shefford; John Charles Lowe, Bedford, both of United Kingdom

[73] Assignee: New Holland North America, Inc., New Holland, Pa.

[21] Appl. No.: 08/948,868

[22] Filed: Oct. 10, 1997

[30] Foreign Application Priority Data

Mar. 12, 1997 [GB] United Kingdom .................. 9705132

[51] Int. Cl.$^6$ ...................................................... A01B 63/11
[52] U.S. Cl. ................................ 172/2; 364/424.07; 172/4
[58] Field of Search .................................. 37/348; 172/1, 172/2, 3, 4, 4.5, 7, 9; 364/424.07, 167.01; 280/707, 772, DIG. 1

[56] References Cited

U.S. PATENT DOCUMENTS

| | | | |
|---|---|---|---|
| 4,093,248 | 6/1978 | Gassner | 172/2 X |
| 4,141,419 | 2/1979 | Buchele et al. | 172/2 X |
| 4,385,353 | 5/1983 | Schneider | 172/2 X |
| 4,667,744 | 5/1987 | Kauss et al. | 172/2 |
| 4,878,543 | 11/1989 | Kauss | 172/2 |
| 5,479,992 | 1/1996 | Bassett | 172/2 X |

*Primary Examiner*—Robert E. Pezzuto
*Attorney, Agent, or Firm*—Larry W. Miller; Frank A. Seemar; J. William Stader

[57] ABSTRACT

In the field of agricultural tillage, there is a need for accurate, automated control of the widths of tilling implements, such as ploughs. The invention concerns methods of controlling a plough operatively combined with a vehicle such as a tractor, the methods including logging a series of values of the strength of soil encountered during a pass along a field; selecting the most frequently occurring soil strength value; and, for a subsequent pass of the tractor/plough combination along the field in the same direction, setting the width of the plough in dependence on the most frequently logged soil strength value. A microprocessor is provided to carry out the methods of the invention.

30 Claims, 3 Drawing Sheets

METHOD AND APPARATUS FOR CONTROLLING WIDTH-ADJUSTABLE TILLAGE IMPLEMENT

BACKGROUND OF THE INVENTION

This invention concerns to improvements in or relating to tillage. In particular, the invention relates to a method and apparatus for controlling a width adjustable tillage implement such as a plough operatively combined with a powered vehicle such as a tractor or other multi-purpose agricultural vehicle.

Conventionally a plough is secured to the three point hitch at the rear of a tractor. An operator of the tractor may use controls in the tractor cab to set the ploughing depth of the implement. This results in raising or lowering of the members of the three point hitch until the desired ploughing depth is obtained. Most ploughs are invertible by means of actuators also conventionally controlled from within the tractor cab. Inversion of a plough at the end of a first pass along a field ensures that the furrows ploughed during the next succeeding pass (during which the tractor travels in a direction opposite its direction during the first pass) face in the same direction as those ploughed during the first pass.

The width of many ploughs is adjustable, by means of powered actuators mounted on the plough that are, conventionally, controllable from within the tractor cab. When a plough is adjusted to a wide setting the width of tillage increases correspondingly. Thus the workrate of the tractor/plough combination is potentially increased commensurately if the tractor maintains a constant forward speed. However, increasing the plough width increases the draught experienced by the tractor, ie. the force needed to pull the plough through the soil. This tends to increase the tractor's fuel consumption rate at a given speed, because of a need to fuel the tractor engine at a higher rate; or because of a need to shift transmission to a lower ratio; or both. In the alternative, the tractor may be driven at a lower speed to try and maintain a constant fuel consumption rate, but then the workrate improvement from the wider plough setting may be offset. There may in any event be an increase in fuel consumption, through running of the tractor engine at an inefficient speed.

Any attempt to achieve compromise settings for the plough width, ploughing depth and engine governor that give rise to acceptable work rates without increasing the tractor's fuel consumption rate excessively are virtually impossible for a tractor operator alone to achieve in practice. This is primarily because the strength of soil (ie. its resistance to cultivation) varies over typically a range of eg. 30 $kNm^{-2}$ to 60 $kNm^{-2}$ from place to place in a field. The tractor operator is often unable to prevent wheel slip, over revving of the tractor engine or stalling of the engine when the plough encounters sudden changes in the soil strength.

Patent application GB 9622087.6 discloses an automatic control apparatus and a control method for operating a tractor/implement combination in order to maintain a constant ploughing depth whilst simultaneously optimizing a performance parameter of the vehicle/implement combination. Typical such performance parameters include the workrate of the vehicle/implement combination; and the fuel consumption rate of the vehicle.

SUMMARY OF THE INVENTION

This invention provides a method and apparatus suitable for use in conjunction with the method of GB 9622087.6; and suitable for use in conjunction with other vehicle/implement automatic and semi-automatic control arrangements.

According to a first aspect of the invention, there is provided a method of controlling a width adjustable tillage implement operatively combined with a powered vehicle, the method comprising:

i. tilling with the implement for a first period;

ii. obtaining a plurality of measured values of the strength of the soil tilled during the first period;

iii. at the end of the first period, analyzing the measured soil strength values and selecting a first soil strength value characteristic of the soil strength values encountered during the first period; and iv. adjusting the width of the implement, in dependence on the first soil strength value, to a width for use during a subsequent tilling period.

This method advantageously provides a width adjustment technique suitable for use with the apparatus of GB 9622087.6. The method of the invention also advantageously makes use of the headland turn of a tractor/implement combination for determining and, as necessary, adjusting the plough width setting for a subsequent pass along a field.

Preferably during the subsequent period, tilling occurs in generally the same direction as in the first tilling period. Thus, the method of the invention may be used to determine at the end of a first pass an optimal width setting for a subsequent pass along the field in the same direction. This is advantageous because (i) the strength of a given area of soil encountered by a plough may differ depending on the direction of approach of the plough; and also, of course, because (ii) many fields are inclined and hence give rise to different loadings on the vehicle/implement combination, depending on its direction of travel. Thus it is desirable that the method of the invention includes the sub-step of storing of an optimal value of the width setting determined from the average soil strength, until the vehicle/implement combination next tills in the same general direction.

Conveniently the method includes:

v. tilling with the implement for a second period;

vi. obtaining a plurality of measured values of the strength of the soil tilled during the second period;

vii. at the end of the second period, analyzing the measured soil strength values and selecting a second characteristic soil strength value characteristic of the soil strength values encountered during the second period; and viii. adjusting the width of the implement, in dependence on the second characteristic soil strength value, to a width for use during a further, subsequent tilling period.

Thus the method permits optimization of the implement width, in dependence of average soil strength values, for a plurality of directions of travel in a field.

Most fields are generally rectangular, so the number of different tilling directions to be accommodated in this way is usually limited to two (ie. representing passes in opposite directions along a field).

Therefore, in preferred forms of the invention, in the further, subsequent period tilling occurs in generally the same direction as in the second period; and tilling in the first period occurs in generally the opposition direction to that of tilling in the second period.

Nonetheless, it may be desirable to allow for more than two directions of travel during tilling.

The method preferably includes:

ix. inverting the tilling implement between consecutive tilling periods; and encoding of the measured soil strength values in dependence on the orientation of the tilling implement. This provides an advantageously simple method of ensuring that each width adjustment of the implement is determined from soil strength values detected during a previous pass along the field in the same direction.

Conveniently the or each step of obtaining a plurality of measured soil strength values includes:

xi. periodically measuring a variable of the vehicle/implement combination, the variable being proportional to the draft between the implement and the vehicle. This is particularly advantageous when the method is employed in a vehicle/implement combination including control apparatus as disclosed in GB 9622087.6.

An advantageous frequency for measuring of the said variable of the vehicle/implement combination has been found to be equal to or greater than 4 Hz.

Preferably the measured values of the variable are converted to values of soil strength and stored in a memory means as a histogram. Thus the inventive method is suitable for implementation by a microprocessor that may be installed in the vehicle.

Preferably the soil strength values are rounded to the nearest 5 kNm$^{-2}$. This confers acceptable accuracy on the method without requiring lengthy processing times when the method of the invention is implemented by a microprocessor or other computing device.

Conveniently the measured variable is or includes a static draft measurement. In particular, the measured value of the variable may be converted to a soil strength value using the formula:

$$D=(C1+C2.gs^2)\cdot d\cdot w\cdot n.$$

in which:

D=draught (kN)

C1=soil strength (kN/m$^2$)

C2=dynamic draught coefficient ([kN/m$^2$]/[km/h]$^2$)

gs=ground speed of the vehicle/implement combination (km/h)

d=working depth of implement (m)

w=width of implement (m)

n=number of furrows

The dynamic draft coefficient C2 may be derived from the measured draft value and the ground speed (gs) value.

The method of the invention may incorporate capturing data from a plurality of sensors located on or in the vehicle/implement combination in order to permit use of the above-identified formula.

Conveniently the method includes tilling for one or more further tilling periods in which tilling occurs in directions generally parallel to that of the first and second periods, the number of periods of tilling being equivalent to the tilling of a predetermined area of land, the method including the step of mapping and storing in a memory the soil strength values occurring over the predetermined area.

This advantageously permits subsequent analysis and/or manipulation of the soil strength data, for example in order to generate for a farmer a plot showing areas of a field requiring extra cultivation or the application of specialized chemicals in order to aid subsequent cultivation.

The following definitions of optimal features of the invention relate to aspects thereof particularly suitable for when the method is practiced using the apparatus, or in conjunction with the method, of GB 9622087.6.

When, as is usually the case, the tilling depth of the implement is adjustable, the method may optionally include:

xii. adjusting one or more performance parameters of the vehicle during tilling, whereby to permit maintenance of a constant value of the tilling depth and to optimize a performance characteristic of the vehicle/implement combination.

Preferably the one or more performance parameters are selected from:

workrate;

fuel consumption.

Conveniently the step of adjusting the width of the implement in dependence on the average soil strength value includes the sub-steps of:

xiii. measuring the value of the performance characteristic of the vehicle/implement combination;

comparing the said measured value and a steady state reference model of the performance characteristic; and adjusting the implement width so as to minimize any difference between the said performance characteristic and the steady state reference model.

This aspect of the method may include the further sub-steps:

xiv. adjusting the implement width to a value predicted to minimize the difference between the measured value and the steady state reference model;

xv. further tilling with the implement and measuring a further value of the said performance characteristic;

xvi. comparing the further performance characteristic value and the steady state reference model;

xvii. if necessary, further adjusting the implement width to minimize the difference between the performance characteristic and the steady state reference model;

as necessary xviii. repeating steps xiv. to xvii. further to minimize the said difference; and, optionally, xviii. detecting one or more characteristics of the tilth; and xix. modifying the steady state reference model in dependence on the said detected tilth characteristics.

For the avoidance of doubt, a "steady state" reference model is herein taken to mean a reference model in which the physical characteristics of the tractor/implement assembly are regarded as fixed with respect to any particular instant in time. Thus, for example, parameters such as the mass of the vehicle and the moments of inertia of various sub-components thereof are taken to be constant, even though such parameters will in reality vary during operation of the tractor.

The method normally includes the steps of automatically adjusting the implement width to a value expected to be an optimal value for the prevailing values of the measured draft and for the prevailing setting of a variable performance parameter of the vehicle/implement combination.

Under some circumstances the width of the implement may instead be adjusted to a predetermined value chosen by an operator of the vehicle/implement combination. A further, optional feature of the method may then include:

xx. comparing a first performance characteristic of the vehicle/implement combination, when the implement width is adjusted to the predetermined value, against a further performance characteristic of the vehicle/implement combination when the implement width is adjusted to a value expected to be optimal for the prevailing values of the measured draft and for the prevailing settings of one or more variable performance parameters of the vehicle/implement combination and, if the difference between the first and further performance characteristics exceeds a predetermined maximum;

xxi. transmitting a warning signal to an operator of the vehicle/implement combination.

Thus if the setting selected by an operator of the vehicle/implement combination is too far removed from an optimal width setting that would normally be achieved under prevailing conditions by use of the method, the vehicle operator can be warned.

In preferred embodiments, the tilling of the method is or includes ploughing, although other forms of tilling such as harrowing or operating a rotary cultivator are theoretically within the scope of the method of the invention.

Conveniently the first and second characteristic soil strength values, for example, may be obtained by identifying the most frequently occurring soil strength value from a range of possible values during a said period of tilling. This step may advantageously employ storing of a histogram of soil strength values in eg. a microprocessor. When two soil strength values are encountered with equal frequency during a tilling period, the method may include the step of selecting the larger of the values as the characteristic soil strength value.

According to a second aspect of the invention, there is provided a method of controlling a width-adjustable tillage implement operatively combined with a powered vehicle, the method comprising:

i. tilling with the implement in a first direction for a first period;

ii. obtaining a plurality of measured values of the strength of soil tilled during the first period;

iii. subsequently tilling with the implement in a second direction for a second period;

iv. subsequently adjusting the width of the implement in dependence on a first soil strength value characteristic of the soil strength values obtained during the first period;

v. subsequently tilling, for a further period, in the first direction.

This method may advantageously be used with many of the optional, preferred features of the first aspect of the invention defined herein.

Alternatively, the step of selecting the characteristic soil strength value may include averaging of the soil strength values encountered during a said tilling period.

According to a third aspect of the invention, there is provided an apparatus for controlling the width of a width-adjustable tillage implement operatively combined with a powered vehicle, the apparatus comprising one or more actuators for adjusting the width of the implement; one or more sensors for detecting the strength of soil previously tilled by the implement; and a processor for controlling the or each actuator in dependence on the detected soil strength values, wherein the processor stores detected soil strength values during a period of tilling and at the end of said period averages the stored values to obtain an average soil strength value, the processor subsequently controlling the or each actuator to adjust the width of the implement in dependence on the average soil strength value.

Such an apparatus is advantageously suited for practicing of the method of the invention.

In preferred embodiments the processor includes means for ensuring that such width adjustment of the implement occurs before subsequent tilling in generally the same direction as the direction of tilling during the first tilling period. Such means may for example include one or more means for receiving and recognizing sensor signals indicative of the orientation of an invertible plough, the orientation of which is uniquely associated with a chosen direction of travel of the vehicle/plough combination.

Preferably the processor includes a memory for storing a histogram of soil strength values and means for comparing the most frequently occurring soil strength value against said histogram whereby to obtain the average soil strength value associated with the period of tilling.

Alternatively, the apparatus may include means for averaging the soil strength values encountered during a said tilling period.

Conveniently the apparatus may include one or more sensors for:

detecting the width adjustment of the tillage implement and generating a width signal indicative thereof; and/or detecting the depth setting of the tillage implement and generating a depth signal indicative thereof, said signals being input to the processor.

Preferably the implement is invertible and the apparatus includes one or more sensors for generating an orientation signal indicative of the orientation of the implement, the orientation signal being input to the processor.

The processor may advantageously receive the width and depth signals in analogue form and the orientation signal in digital form.

In preferred embodiments, the processor may include an interface for communicating with a CAN for controlling the actuators adjusting the or each performance parameter of the vehicle/implement combination; and/or maintaining a constant depth setting of the implement.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Referring to the drawings, there is shown an agricultural tractor denoted by the reference numeral 10. In common with such vehicles in general, tractor 10 has front 11 and rear 12 pairs of driven wheels. Tractor 10 also has an engine (not shown in the drawings), a transmission system including a gearbox, transfer box and appropriate differentials for the driven wheels; an operator cab 13 and a three point hitch 15 at the rear of the vehicle between the rear wheels for attachment of an adjustable implement, which in the embodiment shown is a plough 60.

The ploughing width of reversible plough 60 shown is adjustable.

Thus the tractor/implement combination 10 may be regarded as comprising a plurality of controllable subsystems, each of which influences the performance of the tractor in dependence on the prevailing conditions. The sub-systems include the engine (adjustable in one of two ways, ie. by means of a throttle setting or by means of an engine governor setting, depending on the engine type); the transmission (adjustable by virtue of selection of gear ratios); the three point hitch 15; and the plough 60 adjustable in a manner described below by adjustment of one or more actuators.

Tractor/implement combination 10 includes a plurality of slave controllers for the sub-systems, in the form of microprocessors 41, 42, 43 and 48.

Figure 1:
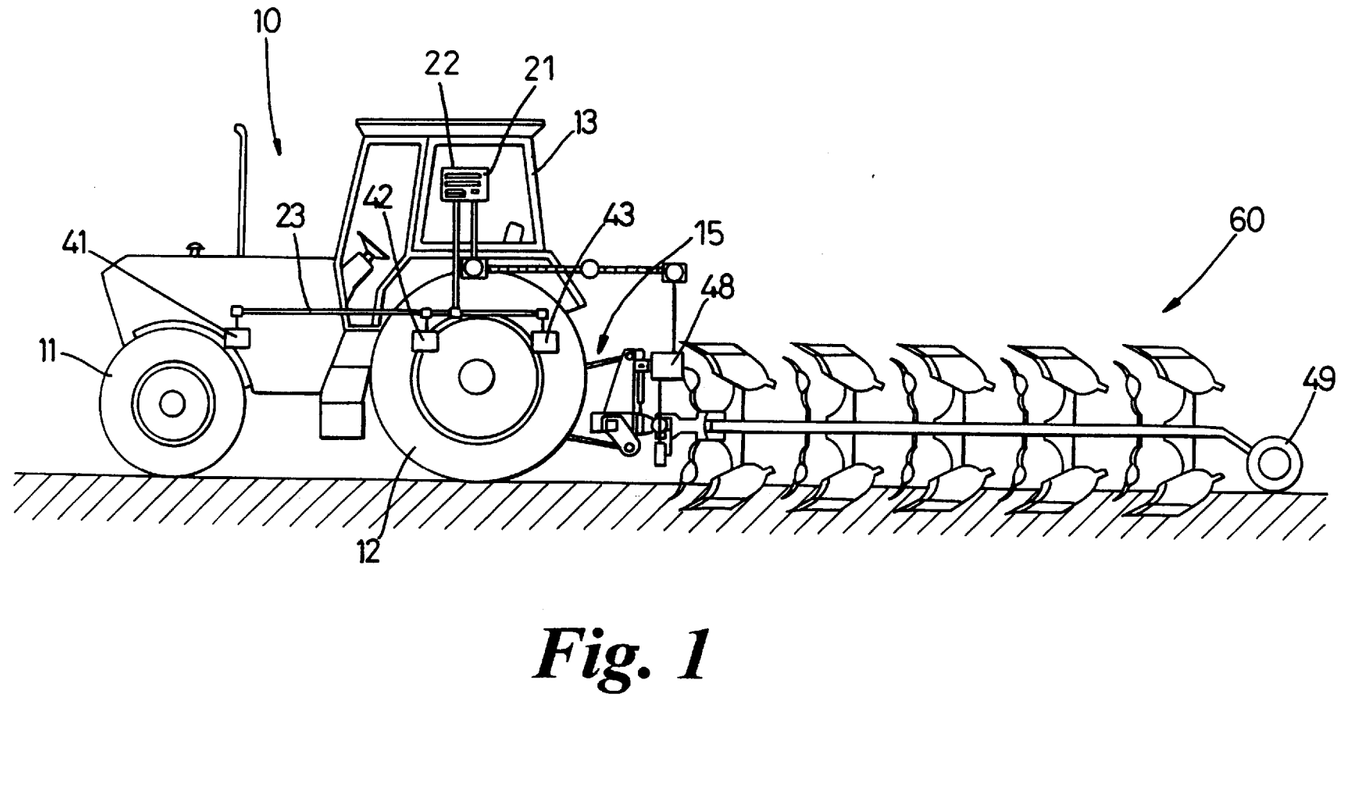
FIG. 1 is a schematic representation of a tractor/implement combination according to the invention.

Certain parameters of the engine performance are controlled by means of an engine management system including microprocessor 41 that optimizes engine performance in dependence on the throttle or engine governor settings input either by the tractor operator using suitable control members, or from a programmable controller constituted as a further microprocessor 21 (described in greater detail in GB 9622087.6) located in the cab of the FIG. 1 vehicle. The engine management system operates by adjusting various parameters, such as the metering volume of a fuel injection system, the timing of the fuel injection system, the boost pressure of a turbocharger (if present), the opening of engine valves and the opening of portions of the vehicle exhaust system, via suitable powered actuators such as solenoids.

Tractor 10 includes a semi-automatic transmission system in which the transmission ratio selected is determined by a slave controller in the form of microprocessor 42 acting on one or more solenoids to engage and disengage gear sets of the gear box and/or gears of the transfer box, in dependence on the settings of a plurality of gear levers in the operator's cab or in dependence on signals from microprocessor 21.

The FIG. 1 embodiment includes hitch microprocessor 43 and plough control microprocessor 48.

Microprocessor (slave controller) 43 controls the positions of the elements of the implement (three point) hitch 15. Again, the microprocessor 43 controls a number of actuators such as solenoids in dependence on the settings of control levers in the operator's cab 13, on signals received from microprocessor 21, or in dependence on its own programming.

Microprocessor 48 is operatively connected to actuators, eg. hydraulic actuators, for adjusting the width of the plough and for reversing the plough at the end of each furrow and operates in dependence on signals received from microprocessor 21; from lever settings in cab 13; or according to its own programming.

Plough 60 is a fully-mounted, reversible plough 60. By "fully mounted" is meant an implement the depth of which is adjusted by the tractor implement hitch, and not by actuators on the implement itself. (The latter class of implement is generally referred to as a "semi-mounted" implement.) Thus the FIG. 2 implement is fully mounted notwithstanding the presence of a stabilizer wheel 49. However the ploughing depth may in alternative embodiments also be adjusted by virtue eg. of support wheels and/or remote actuators.

A further embodiment of the invention, not shown in the drawings, may be similar to the FIG. 1 embodiment except that the implement hitch has attached thereto a semi-mounted plough. Numerous other implements may equally well be secured to either the front or the rear of the tractor.

Microprocessor 21 in the embodiment shown lies within the cab 13 and is operatively connected to an operator interface/control unit 22. Preferably, although not essentially, microprocessor 21 includes in its NVM or a removable memory module a steady-state reference model of the operation of the tractor/implement combination when carrying out a variety of tasks under a variety of different field conditions. The reference model can be updated through use of the tractor/implement combination, in order to take account of contemporaneously prevailing field conditions such as soil strength and tractive efficiency. Thus the reference model may include some data that varies each time the vehicle is used; and some data, such as the mass of the vehicle hardware (i.e. those components whose masses do not alter during use of the tractor), the transmission ratios, the engine output at given engine speeds and torque loads, and so on, that are fixed.

A communication bus 23 interconnects the microprocessor 21 and the microprocessors 41, 42, 43 and 48 associated with the adjustable sub-systems.

Thus in the embodiment shown the controller 21 is able to control each of the microprocessors controlling the adjustable sub-systems. Microprocessor 21 may be regarded as hierarchically the primary microprocessor of the vehicle shown. However it is theoretically possible for the reference model and the control algorithms present in microprocessor 21 to be distributed among a number of microprocessors. In such an arrangement a specific, primary processor 21 may be dispensed with. The invention is considered to include such embodiments.

The mode of control may be adjusted, as desired. For example, the microprocessor 21 may include stored therein a control algorithm that seeks to optimize the workrate of the tractor 10 when carrying out a chosen task.

Another algorithm representing another control mode may seek to minimize the specific or actual fuel consumption of the tractor.

A further algorithm may be selected to return control of at least some of the tractor sub-systems to the operator, who may then use the conventional cab-mounted levers and controls of the vehicle. Such a mode is necessary e.g. when the tractor 10 is driven on roads between field operations; and when turning in the headland at the end of a field, where it is thought that automatic control of the entire tractor/plough combination would offer no benefits. When such a mode is selected, the microprocessor 21 ceases to influence the microprocessors 41, 42, 43 and 48 until an automatic control mode is again engaged, but the microprocessors 41, 42, 43 and 48 may remain active throughout this period in order to provide independently controllable sub-systems. The control of the microprocessor 48 during turning in the headland is described hereinbelow.

The various modes of operation need not be stored in any of the microprocessors. Indeed, there may be some benefit in providing the software for the various control modes in removable memory devices such as diskettes, so that a tractor user can purchase only the software that is of use to him. Similarly, modified versions of the reference model may be supplied in removable memory devices so that the control apparatus may be tailored to a farmer's individual requirements.

Figure 2:
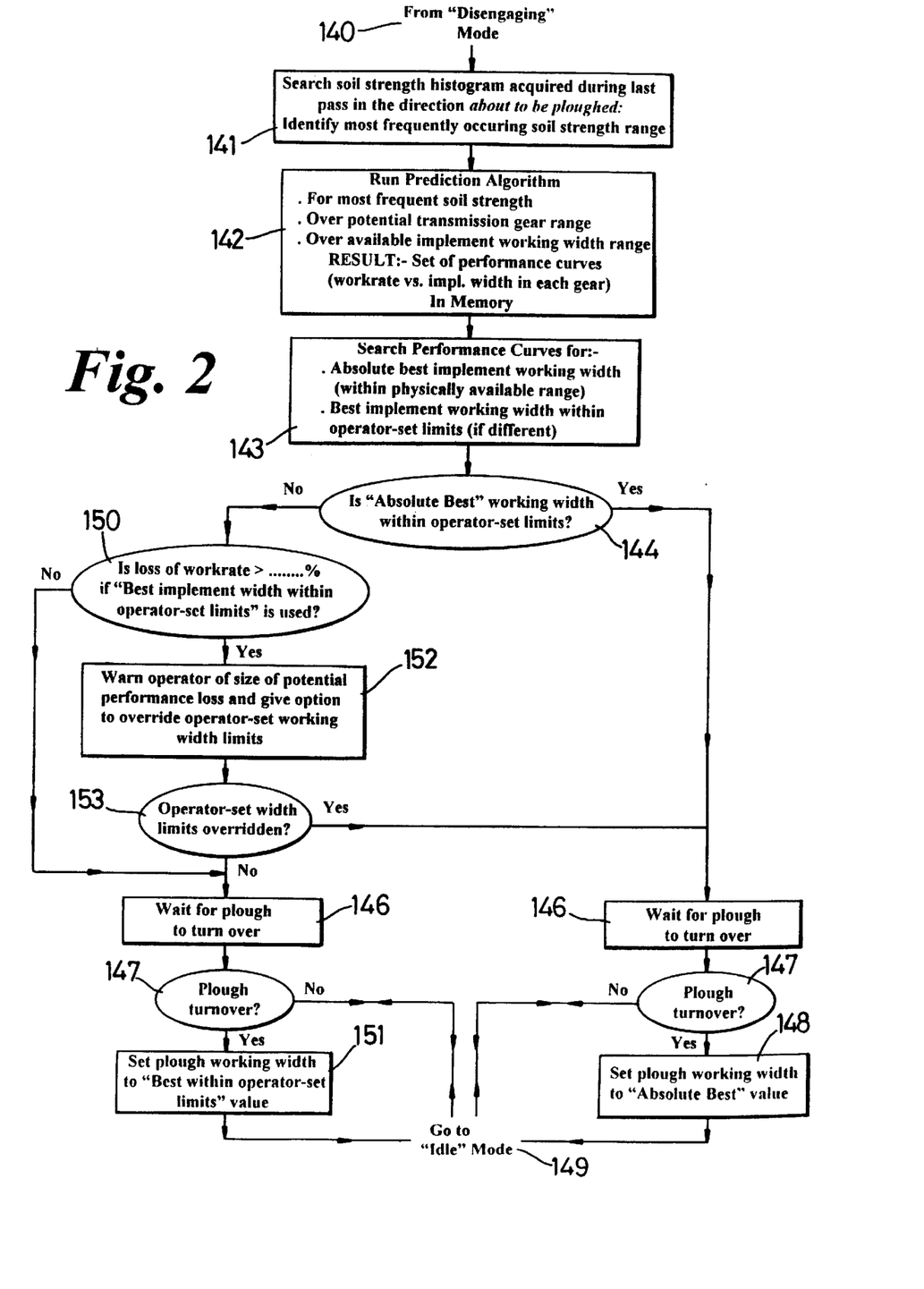
FIG. 2 is a flow chart showing the steps of the method of the invention.

Referring now to FIG. 2, there is shown a flow diagram representative of the headland mode subroutine that is operated by microprocessors 43 and 48 when microprocessor 21 relinquishes control of them to permit turning of the tractor 10 in the headland.

In the FIG. 2 method during tilling operations the control software constantly calculates the implement draft in kN, by the formula:

$$D = (C1 + C2 \cdot gs^2) \cdot d \cdot w \cdot n \quad (1)$$

in which:

D=draft (kN)

C1=static draught coefficient (kN/m$^2$) or soil strength

C2=dynamic draught coefficient ([kN/m$^2$]/[km/h]$^2$)

gs=ground speed (km/h)

d=working depth (m)

w=furrow width (m)

n=no. of furrows

C2 is derivable from C1, that in turn is available from sensor measurements. In preferred embodiments of the invention, the transmission ratio, engine speed and (optionally) the implement settings are adjustable to take account of variations in the draft value D in order eg. to optimize workrate, minimize fuel consumption or otherwise control the performance of the vehicle/implement combination.

In the presently most preferred embodiment, in which the implement is a plough, the control software will maintain the plough depth constant throughout the ploughing operation. Thus adjustment of the implement is limited to width adjustments only—although (as is explained in more detail below) the software is such as not to permit width adjustments to occur while the plough tills the soil. This feature ensures that the resulting furrows do not vary in width from one end to the other.

As is apparent from block 140, the headland mode subroutine is called from a "disengaging mode" subroutine programmed into microprocessor 21, that controls the vehicle/implement combination while the plough rises from the soil at the end of a pass along the field. The disengaging mode subroutine returns control of the engine governor to the vehicle operator while turning occurs.

At block 141, the headland mode subroutine searches a soil strength histogram acquired during the previous pass in the direction about to be ploughed, and identifies the most frequently occurring soil strength range. This is achieved through analysis of the recorded soil strength values. The soil strength values are in the preferred embodiment stored as a histogram in microprocessor 21. If two soil strength values occur with equal frequency, the software identifies the higher of the two as the "most frequently occurring" value, to ensure that the draft of the plough remains within acceptable limits.

Alternatively, microprocessor 21 may at block 141 simply generate an average soil strength value from the recorded values, instead of identifying the most frequently occurring value. Nonetheless, for economy the latter term is used herein to cover either method of identifying a soil strength value characteristic of the previous pass along the field.

Subsequently (block 142) the software runs a prediction algorithm in respect of the most frequently encountered soil strength over the potential transmission gear range and over the available implement working width range. This results in a set of performance curves (workrate versus implement width in each gear) that is stored in the memory of the CPU.

At block 143, these performance curves are searched for the absolute best implement working width (ie. over the entire range of adjustment of implement working widths); and the best implement working width within (optional) operator-set limits (if they differ from the broad range referred to hereinabove).

A determination is then made (block 144) whether the absolute best working width lies within the operator-set limits. If the result of this determination is affirmative, or if the tractor operator has not specified his preferred plough width, at block 146 the software simply waits for the plough to turn over, tests whether this has occurred (block 147), sets the plough working width to "absolute best" value (block 148) (through operation of one or more adjustment actuators mounted on plough 60) and (block 149) reverts to an idle mode preparatory to running of subroutines (described in GB 9622087.6) for engaging the plough with the soil for tilling; and for controlling the operation of the tractor/plough combination during ploughing.

If the determination, of whether the absolute best working width is within the operator-set limits, is negative, the software then calculates whether the loss of workrate, resulting from failure to use the "absolute best" working width, is greater than a predetermined percentage (step 150). If the result of this determination is negative, the software waits for the plough to turn over, checks for plough turn over, sets the plough width to the best within operator-set limits value and reverts to the idle mode (blocks 146, 147, 151 and 149).

If on the other hand the loss of work rate determined at step 150 is excessive, a warning indication is made (eg. via the operator display 22 in the preferred embodiment) to the operator (block 152) that the potential performance loss is great. The operator is then given the option of overriding the operator-set working width limits in order to optimize workrates. The override may take the form of re-specifying the operator-set working width, or of allowing the software to calculate and implement an "absolute best" optimal width.

If (block 153) the operator overrides the previous operator-set width, steps 146, 147, 148 and 149 are repeated. If this results in an acceptable absolute best working width calculation, the subroutine reverts to idle mode preparatory to running of the engaging and operational subroutines mentioned above.

If the operator chooses not to override the previous operator-set limits at block 153, the software waits for the plough to turn over (block 146), checks for plough turnover (block 147); sets the plough working width to the best available working width within the range of operator-set limits (block 151) and reverts to idle mode preparatory to engagement of engaging and then engaged modes.

The steps of FIG. 2 are repeated each time the tractor/plough combination completes a pass along the field. The characteristic soil strength value obtained each time is derived from the histogram of soil strength values recorded during the last pass in the same direction as that about to be ploughed.

The bits of data corresponding to the respective directions of travel of the tractor/plough combination would of course be encoded in dependence on the orientation of the plough, since the plough is inverted by the control software each time the tractor changes direction. The plough may include a sensor 90 (FIG. 3) generating encoding signals indicative of its orientation.

During passes along the field, the software acquires data on the soil strength by measuring the draft experienced between the tractor and the plough, preferably at a sampling rate of equal to or greater than 4 Hz. This sampling rate has been found to provide adequate reaction times for the apparatus of the invention when eg. sudden changes in soil strength are encountered.

In addition to their function of providing a steady state model for setting of the implement width, a plurality of histograms of soil strength may also be stored in memory in, for example, microprocessor 48 or microprocessor 21, or in a removable memory device in order to provide a map of soil strength values in a field. The stored map may be appropriately electronically labelled to identify it to a particular field, and may be used by a farmer in subsequent operations on the field such as harrowing, furrow pressing and even the application of specialized chemicals in order to take account of variations in the soil strength in order to produce a more consistent crop.

Figure 3:
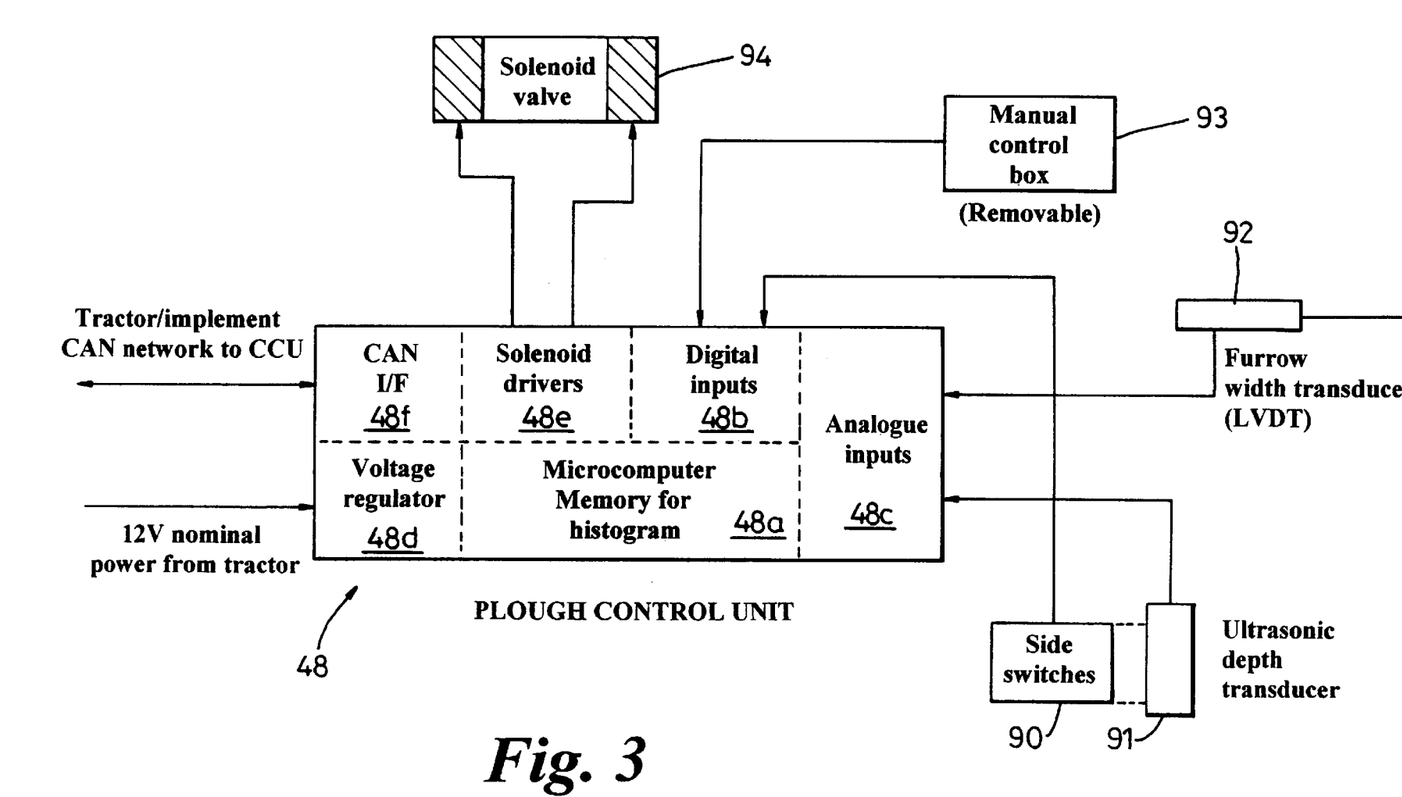
FIG. 3 is a block diagram representation of a control apparatus, incorporated in the FIG. 1 apparatus, for implementing the method of FIG. 2.

Referring now to FIG. 3, the relationship between microprocessor 48 and the remainder of the components of FIG. 1 is shown in more detail.

Microprocessor 48 comprises a central processor or microcomputer 48a, having a digital input interface 48b and an analogue input interface 48c. Microprocessor 48a receives power via a voltage regulator 48d from the 12 volt power supply of the tractor. Microprocessor 48a can output signals via a solenoid driver 48e. There is also an input/output interface 48f with the controller area network (CAN) of the tractor/plough combination. The primary component of the CAN is microprocessor 21.

The digital interface 48b receives signals, including signals indicative of the orientation of plough 60 from a signal generator in the form of a pair of microswitches, indicated by reference numeral 90, that generate signals uniquely identifying the orientation of plough 60. The microswitches are physically secured to an ultrasonic depth sensor 91 that generates analogue signals (input via the analogue interface 48c to microprocessor 48a) indicative of the depth of ploughing. Thus the depth sensor provides feedback data on the ploughing depth for comparison against the set point ploughing depth calculated by microprocessor 21 during ploughing operations.

During ploughing, the draught values (that are proportional to the soil strength) are recorded in microprocessor 21, and encoded by microprocessor 48a using data from the microswitches 90 indicative of the orientation of plough 60.

Further feedback of the operation of plough 60 during ploughing operations is accomplished by a furrow width transducer 92 that provides feedback data on the actual width ploughed, for comparison against the set point plough width determined by microprocessor 21.

FIG. 3 includes an optional, manual control box 93 that may be used eg. for adjusting the width setting of plough 60 in the absence of signals from the CAN.

Finally, the solenoid driver 48e of controller 48 is operatively connected to a solenoid valve indicated schematically by reference number 94 for adjusting the width setting of the plough 60.

Solenoid valve 94 is shown schematically, since in practice the actual width adjustment arrangement may take a variety of different forms, and may be constituted as a plurality of actuators.

The sensor that provides data on the draft experienced during ploughing may be located on the three point hitch 15, or on a member of the plough 60 secured to three point hitch 15. Other locations for this sensor are also possible.

In use of the apparatus and method of the invention, the plough width and ploughing depth are maintained constant by microprocessor 21 (in accordance with the principles described in GB 9622087.6), and parameters of the tractor are varied eg. in order to maximize work rate or to minimize fuel consumption. If during ploughing the soil strength should increase, the microprocessor 21 responds by temporarily boosting the engine power output (if possible) and/or selecting a lower transmission ratio. Conversely, a reduction in soil strength would cause the microprocessor 21 to shift the transmission to a higher gear. At the headland turn after completion of a pass along the field, the furrow width is adjusted in accordance with the FIG. 2 method by microprocessors 21 and 48 after reversing (inversion) of the plough. The plough is adjusted to a furrow width that according to the determination made in microprocessor 21 at step 143 is most likely to provide an optimal work rate during the return pass down the field. This particular value is, as explained above, preferably determined by logging soil strength values during the previous pass along the field in the same direction, analyzing their distribution, and selecting the most frequently occurring value.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A method of controlling a width-adjustable tillage implement operatively combined with a powered vehicle to till soil, comprising the steps of:

tilling with the implement for a first period;

obtaining a plurality of measured values of strength of the soil tilled during the first period;

at the end of the first period, analyzing the measured soil strength values and selecting a first characteristic soil strength value characteristic of the soil strength values encountered during the first period;

adjusting the width of the implement, in dependence on the first characteristic soil strength value, to a width for use during a second tilling period;

tilling with the implement for a second period;

obtaining a plurality of measured values of strength of the soil tilled during the second period;

at the end of the second period, analyzing the measured soil strength values and selecting a second characteristic soil strength value characteristic of the soil strength values encountered during the first period; and adjusting the width of the implement, in dependence on the second characteristic soil strength value, to a width for use in a further, subsequent tilling period.

2. The method of claim 1 wherein said step of tilling for a second period occurs in generally the same direction as in the step of tilling for a first period.

3. The method of claim 2 wherein in the further, subsequent period, tilling occurs in generally the same direction as in the second tilling period.

4. The method of claim 3 wherein the step of tilling for the first period occurs in generally the opposite direction to the step of tilling for the second period.

5. A method of controlling a width-adjustable tillage implement operatively combined with a powered vehicle, comprising the steps of:

tilling with the implement in a first direction for a first period;

obtaining a plurality of measured values of the strength of soil tilled during the first period;

subsequently tilling with the implement in a second direction for a second period;

subsequently adjusting the width of the implement in dependence on a first soil strength value characteristic of the soil strength values obtained during the first period;

subsequently tilling, for a further period, in the first direction.

6. The method of claim 5 further comprising the steps of:

inverting the tilling implement between consecutive periods; and encoding the measured soil strength values in dependence on the orientation of the tilling implement.

7. The method of claim 6 wherein each step of obtaining a plurality of measured soil strength values includes the step of:

periodically measuring a variable of the vehicle/implement combination, the variable being proportional to the draft between the implement and the vehicle.

8. The method of claim 7 wherein the measurement of the variable of the vehicle/implement combination occurs at a frequency of at least 4 Hz.

9. The method of claim 7 wherein the measured values of the variable are converted to values of soil strength and stored in a memory means as a histogram.

10. The method of claim 9 wherein the measured variable includes a static draft measurement.

11. The method of claim 10 wherein the measured value of the variable is converted using the formula:

$$D = (C1 + C2 \cdot gs^2) \cdot d \cdot w \cdot n$$

in which:

D = draft (kN)

C1 = soil strength (kN/m$^2$)

C2 = dynamic draft coefficient ([kN/m$^2$]/[km/h]$^2$)

gs = ground speed of the vehicle/implement combination (km/h)

d = working depth of implement (m)

w = width of implement (m)

n = number of furrows.

12. The method of claim 10 further comprising the steps of:

tilling for at least one further tilling period in which tilling occurs in directions generally parallel to that of the first and second periods, the number of further periods of tilling being equivalent to the tilling of a predetermined area of land; and mapping and storing in said memory means the soil strength values occurring over the predetermined area.

13. The method of claim 12 wherein the implement is adjustable with respect to a tilling depth, said method further comprising the step of:

adjusting at least one performance parameter of the vehicle during tilling to maintain a constant value of the tilling depth and to optimize a performance characteristic of the vehicle/implement combination.

14. The method of claim 13 wherein the at least one performance parameter is selected from:

a vehicle transmission ratio; and a vehicle power supply speed.

15. The method of claim 13 wherein the vehicle/implement performance characteristic is selected from:

work rate; and fuel consumption.

16. The method of claim 15 wherein the step of adjusting the width of the implement in dependence on the average soil strength value includes the sub-steps of:

measuring the value of the performance characteristic of the vehicle/implement combination;

comparing said measured value and a steady state reference model of the performance characteristic; and adjusting the implement width so as to minimize any difference between said performance characteristic and the steady state reference model.

17. The method of claim 16 wherein the sub-step of adjusting the implement width includes the further sub-steps:

adjusting the implement width to a value predicted to minimize the difference between the measured value and the steady-state reference model;

further tilling with the implement and measuring a further value of said performance characteristic;

comparing the further performance characteristic value and the steady state reference model;

if necessary, further adjusting the implement width to minimize the difference between the performance characteristic and the steady state reference model;

and as necessary, repeating said further adjusting step to minimize further said difference.

18. The method of claim 17 wherein the sub-step of adjusting the implement width further includes the sub-steps of:

detecting at least one characteristic of the the soil being tilled; and modifying the steady state reference model in dependence on the detected characteristic of the soil being tilled.

19. The method of claim 18 wherein the implement width is automatically adjusted to a value expected to be optimal for the measured values of soil strength and for the measured value of a performance parameter of the vehicle/implement combination.

20. The method of claim 19 wherein when the implement width is adjusted to a predetermined value chosen by an operator of the vehicle/implement combination, said method includes the steps of:

comparing a first performance characteristic of the vehicle/implement combination when the implement width is adjusted to the predetermined value against a further performance characteristic of the vehicle/implement combination when the implement width is adjusted to a value expected to be optimal for the measured values of soil strength and for the measured values of performance parameters of the vehicle/implement combination; and transmitting a warning signal to an operator of the vehicle/implement combination if the difference between the first and further performance characteristics exceeds a predetermined maximum.

21. The method of claim 20 wherein each characteristic soil strength value is obtained by the step of:

identifying a most frequently occurring soil strength value from a range of values encountered during said period of tilling.

22. The method of claim 21 wherein, when two different soil strength values are encountered with equal frequency during said period of tilling, the step of identifying a most frequently occurring soil strength value includes the step of:

selecting the larger of the two different soil strength values encountered with equal frequency.

23. The method of claim 20 wherein each characteristic soil strength value is obtained by the steps of:

averaging the soil strength values encountered during said tilling period; and using the resulting average soil strength value as the characteristic soil strength value.

24. Apparatus for controlling a width of a width-adjustable tillage implement to till soil having a soil strength when said implement is operatively combined with a powered vehicle, the apparatus comprising at least one actuator for adjusting the width of the implement; at least one sensor for detecting the strength of soil previously tilled by the implement; and a processor for controlling said at least one actuator in dependence on the detected soil strength values, wherein the processor stores detected soil strength values during a period of tilling and at the end of said period analyses the stored values to obtain a characteristic soil strength value characteristic of the soil strength values encountered during said period of tilling, the processor subsequently controlling said at least one actuator to adjust the width of the implement in dependence on the characteristic soil strength value, said processor including a memory for storing a histogram of soil strength values and means for comparing the most frequently occurring soil strength value against said histogram whereby to obtain the average soil strength value associated with the period of tilling.

25. The apparatus of claim 24 wherein the processor is operable to store soil strength values for multiple periods of tilling and includes means for ensuring that width adjustment of the implement occurs before tilling in a subsequent period in a direction that is generally identical to a direction of tilling during a previous tilling period.

26. The apparatus of claim 24 wherein said processor is operable to average the soil strength values encountered during each said tilling period.

27. The apparatus of claim 26 including at least one sensor for:
   detecting the width adjustment of the tillage implement and generating a width signal indicative thereof; and
   detecting the depth setting of the tillage implement and generating a depth signal indicative thereof, said width and depth signals being input to the processor.

28. The apparatus of claim 27 wherein the tillage implement is invertible and the apparatus includes an orientation sensor for generating an orientation signal indicative of the orientation of the implement, the orientation signal being input to the processor.

29. The apparatus of claim 28 wherein the processor receives the width and depth signals in analogue form and the orientation signal in digital form.

30. The apparatus of claim 29 wherein the processor includes an interface for communicating with a CAN for controlling the actuators adjusting each performance parameter of the vehicle/implement combination and for maintaining a constant depth setting of the implement.

* * * * *